(12) United States Patent
Gehris

(10) Patent No.: US 11,117,078 B2
(45) Date of Patent: Sep. 14, 2021

(54) PORTABLE DIFFUSIOPHORETIC WATER FILTRATION DEVICE AND RELATED METHODS

(71) Applicant: Split Rock Filter System LLC, New Paltz, NY (US)

(72) Inventor: William Christian Gehris, New Paltz, NY (US)

(73) Assignee: Split Rock Filter Systems LLC, New Paltz, NY (US)

( * ) Notice: Subject to any disclaimer, the term of this patent is extended or adjusted under 35 U.S.C. 154(b) by 20 days.

(21) Appl. No.: 16/215,562

(22) Filed: Dec. 10, 2018

(65) Prior Publication Data
US 2020/0155984 A1    May 21, 2020

Related U.S. Application Data

(60) Provisional application No. 62/768,976, filed on Nov. 18, 2018.

(51) Int. Cl.
| | |
|---|---|
| B01D 39/02 | (2006.01) |
| B01D 24/30 | (2006.01) |
| B01J 8/00 | (2006.01) |
| B01D 71/70 | (2006.01) |
| B01D 65/02 | (2006.01) |
| B01D 69/02 | (2006.01) |

(52) U.S. Cl.
CPC ............. *B01D 39/02* (2013.01); *B01D 24/30* (2013.01); *B01D 65/025* (2013.01); *B01D 69/02* (2013.01); *B01J 8/006* (2013.01); *B01D 71/70* (2013.01); *B01D 2239/1241* (2013.01)

(58) Field of Classification Search
None
See application file for complete search history.

(56) References Cited

U.S. PATENT DOCUMENTS

| | | |
|---|---|---|
| 4,533,447 A | 8/1985 | Meldon |
| 5,496,472 A | 3/1996 | Slack et al. |
| 6,908,547 B2 | 6/2005 | Cote et al. |

(Continued)

FOREIGN PATENT DOCUMENTS

| | | |
|---|---|---|
| CA | 2909003 A1 | 4/2017 |
| CN | 103807457 | 5/2014 |

(Continued)

OTHER PUBLICATIONS

Hyomin Lee et al.:" Diffusiophoretic exclusion of colloidal particles for continuous water purification," Lab Chip, 2018, 18, 1713-1724, Jun. 21, 2018.

(Continued)

*Primary Examiner* — Krishnan S Menon
*Assistant Examiner* — Brad Gordon

(57) ABSTRACT

A water filtration device includes a diffusiophoretic water filter having an inlet and an outlet and for receiving a colloidal suspension at the inlet and flowing the colloidal suspension between the inlet and the outlet in a flow direction; a diffusiophoretic-inducing membrane; a cover, the membrane and the cover defining a plurality of channels extending between the inlet and the outlet; an outlet splitter for the plurality of channels being fixed with respect to the membrane or the cover, the cover and membrane being flexible and configured to permit rolling up of the membrane and the cover. A related method is also provided.

20 Claims, 4 Drawing Sheets

(56) References Cited

U.S. PATENT DOCUMENTS

| | | |
|---|---|---|
| 9,932,251 B2 | 4/2018 | Crooks et al. |
| 10,155,182 B1 | 12/2018 | Gehris |
| 10,463,994 B2 | 11/2019 | Gehris |
| 10,632,401 B2 | 4/2020 | Gehris |
| 2003/0121841 A1 | 7/2003 | Harttig et al. |
| 2011/0198225 A1 | 8/2011 | Kim et al. |
| 2015/0353376 A1 | 12/2015 | Hanover |
| 2016/0375407 A1 | 12/2016 | Velegol |
| 2018/0201525 A1 | 7/2018 | Crooks et al. |
| 2018/0257054 A1 | 9/2018 | Shardt et al. |
| 2019/0151776 A1 | 5/2019 | Gehris |
| 2019/0151795 A1 | 5/2019 | Gehris |
| 2019/0151803 A1 | 5/2019 | Gehris |
| 2020/0155984 A1 | 5/2020 | Gehris |
| 2020/0255299 A1 | 8/2020 | Stone et al. |

FOREIGN PATENT DOCUMENTS

| | | |
|---|---|---|
| WO | WO 2015/077674 A1 | 5/2015 |
| WO | WO2018048735 A1 | 3/2018 |
| WO | WO2019099586 A9 | 5/2019 |
| WO | WO2020123802 A1 | 6/2020 |

OTHER PUBLICATIONS

"Significance of Zeta Potential in the Adsorption of Fulvic Acid on Aluminum Oxide and Activated Carbon," Anielak et al., Polish Journal of Environmental Studies 20(6):1381-1386 • Jan. 2011.

"Influence of bacteria adsorption on zeta potential of Al2O3 and Al2O3/Ag nanoparticles in electrolyte and drinking water environment studied by means of zeta potential" Jastrzęska et al. , Surface & Coatings Technology 271 (2015) 225-233.

"Adsorption of perfluorooctanoic acid and perfluorooctanesulfonic acid to iron oxide surfaces as studied by flow-through ATR-FTIR spectroscopy" in Environ. Chem. 2012, 9, 148-157, by Xiaodong Gao and Jon Chorover.

"Reverse Osmosis Pretreatment," downloaded on Jan. 14, 2018 from https://www.lenntech.com/ro/ro-pretreatment.htm, Jan. 4, 2008.

"Ultrafiltration" downloaded on Jan. 14, 2018 from https://www.lenntech.com/library/ultrafiltration/ultrafiltration.htm, Mar. 11, 2008.

Isaias:"Experience in reverse osmosis pretreatment," Desalination 139 (2001), 57-64, received Feb. 2, 2001.

Brunelle et al:"Colloidal Fouling of Reverse Osmosis Membranes," Desalination 32 (1980) 127-135, Jan. 1980.

Bessho et al.:"Adsorption Behavior of Beryllium(II) on Copper-oxide Nanoparticles Dispersed in Water: A Model for 7 Be Colloid Formation in the Cooling Water for Electromag nets at High-energ y Accelerator Facilities," Analyticalsciences Nov. 2014,vol. 30, 1069-1074.

Shin et al. "Accumulation of Colloidal Particles in Flow Junction Induced by Fluid Flow and Diffusiophoreses," Physical Review X 7, 041038 (2017), Nov. 16, 2017.

"Membraneless water filtration using CO2" by Shin et al. (Nature Communications 8:15181), May 2, 2017.

"Diffusiophoresis at the macroscale" by Mauger et al. (arXiv: 1512.05005v4), Jul. 6, 2016.

"Origins of concentration gradients for diffusiophoresis" by Velegol et al, (10.1039/c6sm00052e), pp. 4686 to 4703, May 13, 2016.

Lee et al: "Diffusiophoretic exclusion of colloidal particles for continuous water purification", Lab on a Chip 2018, 18, 1713, Jun. 21, 2018.

PORTABLE DIFFUSIOPHORETIC WATER FILTRATION DEVICE AND RELATED METHODS

This application relates generally to water filtration and more particularly to diffusiophoretic water filtration, and claims the benefit of Provisional Patent Application U.S. 62/768,976, filed Nov. 18, 2018.

BACKGROUND

The article "Diffusiophoretic exclusion of colloidal particles for continuous water purification" by Lee et al. (Lab on a Chip 2018, 18, 1713), 21 Jun. 2018, describes using two sheets of a NAFION membrane aligned on a glass slide to perform diffusiophoretic exclusion.

WO 2018/048,735 discloses a device operative in separating particles in a flowing suspension of the particles in a liquid which device comprises: a first, pressurized cavity or plenum adapted to contain a gas, separated by a first gas permeable wall from a second cavity or plenum which contains a charged particle containing liquid which also contains an ion species formed by the dissolution of the gas within the liquid, which is in turn separated by a second permeable wall from the ambient atmosphere or an optional, third, relatively reduced pressure cavity or plenum which may contain a gas or a vacuum; wherein: the permeable walls operate to permit for the transfer of a gas from the first cavity through the second cavity and through the second permeable wall to the atmosphere or a third cavity and, the pressure present in atmosphere or the third cavity is lesser than that of the first cavity, thus forming an ion concentration differential within the liquid and between the permeable walls.

The related article "Membraneless water filtration using $CO_2$" by Shin et al. (Nature Communications 8:15181), 2 May 2017, describes a continuous flow particle filtration device in which a colloidal suspension flows through a straight channel in a gas permeable material made of polydimethylsiloxane (PDMS). A $CO_2$ (carbon dioxide) gas channel passes parallel to the wall and dissolves into the flow stream. An air channel on the other side of the wall prevents saturation of $CO_2$ in the suspension and the resulting gradient of $CO_2$ causes particles to concentrate on sides of the channel, with negatively charged particles moving toward the air channel and positively charged particles toward the $CO_2$ channel. The water away from the sides of the channel can be collected as filtered water.

The article "Diffusiophoresis at the macroscale" by Mauger et al. (arXiv: 1512.05005v4), 6 Jul. 2016, discloses that solute concentration gradients caused by salts such as LiCl impact colloidal transport at lengthscales ranging roughly from the centimeter down to the smallest scales resolved by the article. Colloids of a diameter of 200 nm were examined.

The article "Origins of concentration gradients for diffusiophoresis" by Velegol et al, (10.1039/c6sm00052e), 13 May 2016, describes diffusiophoresis possibly occurring in georeservoir extractions, physiological systems, drying operations, laboratory and industrial separations, crystallization operations, membrane processes, and many other situations, often without being recognized.

PCT Publication WO 2015/077674 discloses a process that places a microparticle including a salt in proximity to a membrane such that the microparticle creates a gradient generated spontaneous electric field or a gradient generated spontaneous chemiphoretic field in the solvent proximal to the membrane. This gradient actively draws charged particles, via diffusiophoresis, away from the membrane thereby removing charged particulate matter away from the membrane or preventing its deposition.

SUMMARY OF THE INVENTION

The present invention provides a water filtration device comprising a diffusiophoretic water filter having an inlet and an outlet and for receiving a colloidal suspension at the inlet and flowing the colloidal suspension between the inlet and the outlet in a flow direction; a diffusiophoretic-inducing membrane; a cover, the membrane and the cover defining a plurality of channels extending between the inlet and the outlet; an outlet splitter for the plurality of channels being fixed with respect to the membrane or the cover, the cover and membrane being flexible and configured to permit rolling up of the membrane and the cover.

The rolling up of the membrane preferably occurs around an axis parallel to the channels.

The outlet splitter preferably is also flexible and capable of being rolled up. The outlet splitter may be integral with the membrane or the cover.

The present invention may contain one or more of the following additional features, alone or in combination with other features:

an inlet manifold for receiving the colloidal suspension including colloidal particles in water;

the inlet manifold including an integral extension of the membrane and/or the cover;

the inlet manifold including a water pressure regulator;

the water pressure regulator having a height regulator;

the outlet splitter having three outlets and two splitter devices;

the channels being openable channels;

the cover being a removable and reassemblable cover;

the cover being fixed to or integral with the membrane;

the membrane being unstructured;

a structured cover defining the plurality of channels;

the membrane being at least 5 cm, preferably at least 10 cm, and in some applications at least a meter in width;

the membrane being at least 10 micrometers in thickness;

the membrane being horizontal;

the membrane being a porous ion exchange membrane sheet, such as NAFION;

the membrane being a water impermeable and gas permeable PDMS membrane for use with a portable gas chamber;

the portable gas chamber including a foldable structure surrounded by a gas retaining membrane;

the membrane stretched taut at least in a width direction;

the cover made in one piece together with a channel structure of longitudinally extending microchannels, each for example of a thickness of 500 micrometers, width of 900 micrometers and extending a meter in length;

the cover and channel structure etched for example via soft lithography into a single piece of PDMS material;

a PDMS barrier between the channels in the width direction of 100 micrometers can be provided, and 1000 or more microchannels provided;

a single piece 1 m×1 m cover and channel structure laid over the NAFION or PDMS membrane;

at least one longitudinally extending clamp so that the cover is clamped with respect to the sheet;

a weight for placement on the cover;

the weight forming part of a clamp for the cover;

at least one longitudinally extending clamp so that the membrane is clamped; and/or the water filter downstream of a portable particle filter for noncolloidal particles.

The present invention also provides a method for operating a water filtration device comprising a diffusiophoretic water filter having an inlet and an outlet and for receiving a colloidal suspension at the inlet and flowing the colloidal suspension between the inlet and the outlet in a flow direction; a diffusiophoretic-inducing membrane; a cover, the membrane and the cover defining a plurality of channels extending between the inlet and the outlet; an outlet splitter for the plurality of channels being fixed with respect to the membrane or the cover, the cover and outlet splitter being flexible, the method comprising rolling or unrolling the membrane and cover.

The rolling and unrolling preferably occurs around an axis parallel to the channels.

The method may include one or more of the following additional features above, alone or in combination with other features:

providing one of more of the structural features listed above;

unrolling the membrane and cover on uneven ground and operating the device on the uneven ground;

the uneven ground may include stones or rocks or gravel and vary by more than 5 mm, 1 cm or even more than 5 cm in height over the extent of the membrane;

unfolding a foldable gas chamber structure on the ground and covering with a gas impermeable membrane, and placing the membrane defining the channels over the structure;

unrolling or rolling the membrane and cover with the outlet splitter;

connecting a separate outlet splitter to the membrane or cover;

connecting the height regulator to the inlet;

the connecting including wrapping an extension of the membrane or cover around the height regulator to define an inlet manifold for the inlet;

flowing the colloidal suspension in a laminar state, most preferably with a Reynolds number less that 2000, and even more preferably less than 200;

a flow velocity being at least 0.05 meters per second;

filtering PFOAs, bacteria, viruses; and/or other charged particles;

filtering negatively charged particles;

filtering positively charged particles;

filtering noncolloidal particles;

removing a cover to open the diffusiophoretic filter;

aiding sedimentation of particles in the water using the device;

packaging the rolled up water filter and height regulator for delivery, for example via parachute;

disposing of the water filter after use.

While the present application claims specific structures and methods, other inventive concepts that may be broader than the present claims.

BRIEF DESCRIPTION OF THE DRAWINGS

One schematic embodiment of the water filtration system of the present invention is shown by reference to FIGS. 1 to 4, in which.

DETAILED DESCRIPTION OF AN EMBODIMENT

Figure 1:
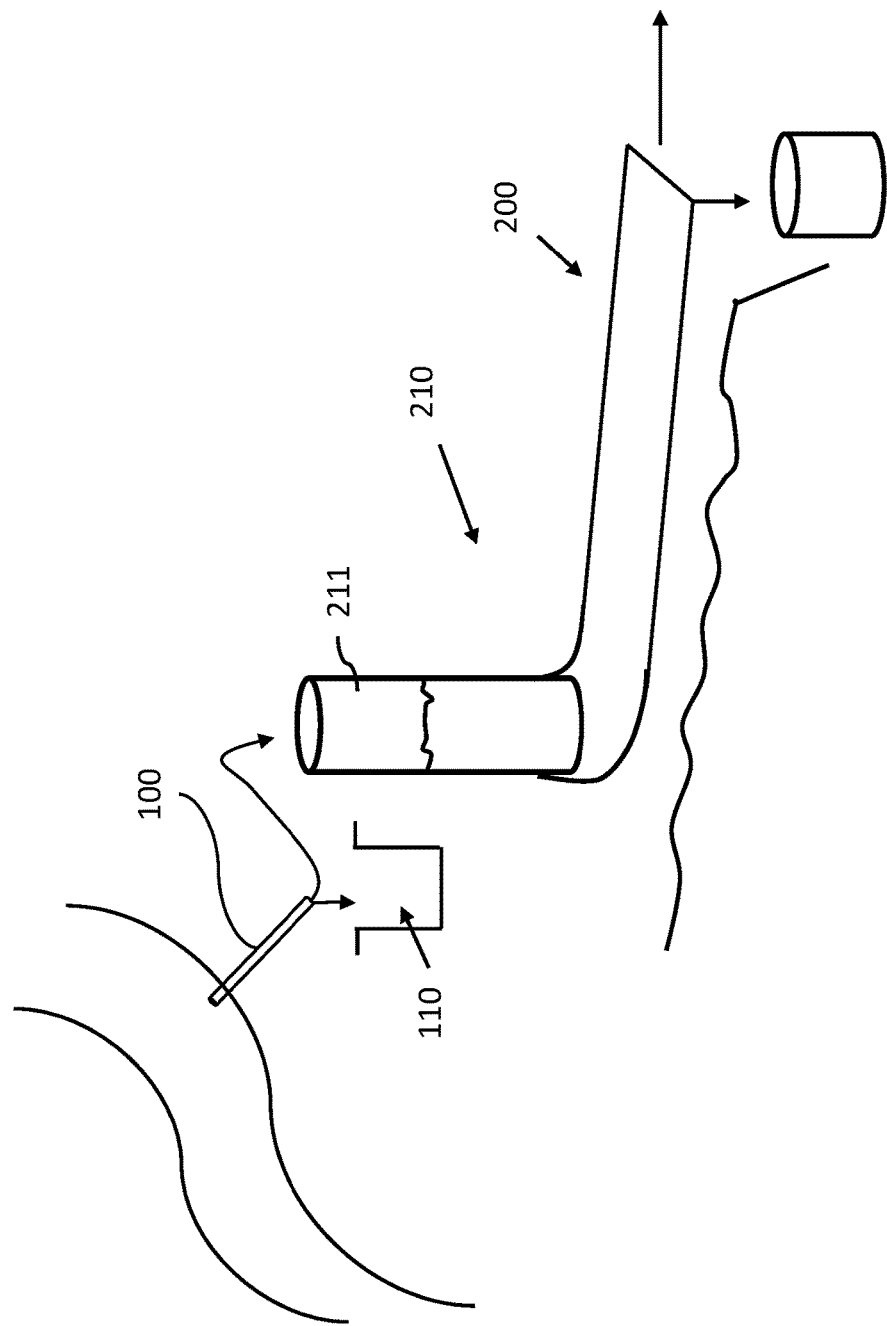
FIG. 1 shows a schematic view of an embodiment of a portable water filtration device system according to the present invention

FIG. 1 shows a water filtration system 100 for cleaning river water, which may contain various particles such as colloidal plastic or metallic particles, and other bioparticles such as bacteria and viruses. Many of these particles are charged negatively or positively. Any type of water with charged colloidal particles may be filtered using the present invention. "Colloidal particle" as defined herein is any particle that can form a colloid or colloidal suspension in water. Such colloidal particles typically range in sizes of a micrometer or less, but larger sizes are possible. The present invention is not limited to filtering colloidal particles, but can also be used to filter larger particles that are impacted by diffusiophoresis, for example even up to 100 nanometers in size or larger, from water. Preferably the particles to be filtered are less than 250 nanometers in size, even if not colloidal. These non-colloidal particles can have very low sedimentation rates, and thus the present invention can aid in "sedimentation" or forcing these larger particles downwardly.

Water can be taken by taking water from a river or pond or other source, for example by a hose 100 working via gravity, such as a siphon. The hose 100 delivers water to a first filter 110 to remove larger particles and impurities. First filter 110 can be for example a membrane filter with an absolute pore size of 1 micrometer or 1000 nanometers, for example as commercially available from BRITA. Filter 110 also could simply be a settling tank. The water with suspended colloidal particles, i.e. a colloidal suspension, together with possible other particles that are larger than typical colloidal sizes, then passes to the water filtration device 200 of the present invention.

Portable water filtration device 200 is designed to remove negatively charged colloidal particles and other particles, the removal of which can significantly increase the water quality.

Figure 2:
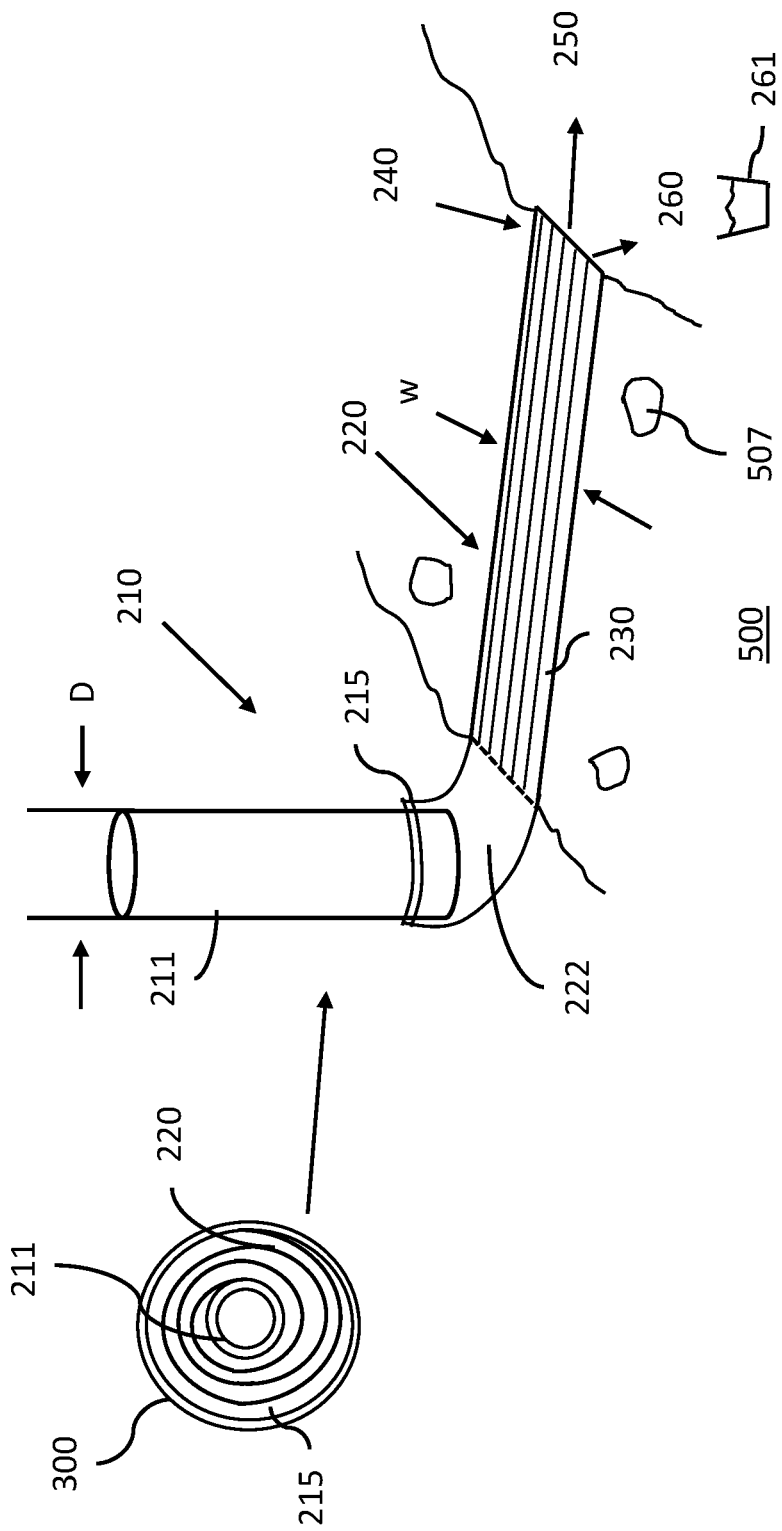
FIG. 2 shows the FIG. 1 embodiment of the water filtration device of the present invention schematically.

Water filtration device 200, shown in FIG. 2 schematically, can be contained in a sealed plastic bag 300, and can include a diffusiophoretic water filter 220 rolled around a pipe 211 and held by a rubber band 215. Filter 220 can be unrolled and laid over the ground 500, which can have rocks, stones and gravel 507. The outlet section 240 can be placed over a ledge or other ground structure to allow water from filtered water outlet 260 to fall into a glass or other container 261. Waste water can exit waste water outlet 250 as will be described.

Water filtration device 200 has an inlet manifold 210 receiving water with colloidal particles. Inlet manifold 210 is defined by pipe 211 and an upstream extension 222 of diffusiophoretic water filter 220. The extension 222 may be a PDMS membrane integral with a membrane cover and used to create an active section 230 of the water filter 220 as will be described with respect to FIG. 3 below. Upstream extension 222 can be sealed water tight, aided for example by a rubber band or clamp 215, around the pipe 211. An outer diameter D of the pipe 211 preferably meets the following equation: $2.2*W/pi > D > 1.8*W/pi$ where W is the width of the active section of the water filter 220. Most preferably the diameter D meets the equation 2.2*W/pi>D>2.0*W/pi, so that the circumference of the pipe is slightly larger than membrane opening (which is approximately 2 W, the sides being on the order of hundreds of micrometers). This allows the membrane extension 222 to stretch over the pipe and aid in sealing, and in some cases permits the rubber band or clamp 215 to not be used at all. Inlet manifold 210 thus spreads the water with colloidal particles in the widthwise direction into the active section 230. In this example the water with colloidal particles is spread in the inlet manifold to a width of 12 cm, and is maintained generally at a depth of 50 cm, which height thus regulates the pressure of the suspension that flows into the active section 230. Larger heights can provide larger pressures, and thus faster velocities through the active section 230.

Inlet manifold 210 includes a pipe 211 which in this example can be a clear polycarbonate tube 8 cm in exterior diameter and 7.5 cm in interior diameter and 75 centimeters in height. Water can be filled to a specific height in the pipe 211 and maintained at that height by the flow rate of water supplied from filter 110, which can equal the flow rate of the suspension through water filter 220. The filter however operates slowly and the water can be simply fed by hand and the exact height can vary for example between 40 and 60 centimeters without altering output water quality significantly. Thus for example when the water height hits 40 centimeters during operation about 0.9 liters can be taken from first filter 110 and poured into the pipe 211 to fill the pipe 211 back up to about 60 cm. Pipe 211 can be held upright via a stand, or simply using rocks or neighboring features to stabilize the pipe in a generally vertical position. However a constant stream of water to be filtered can also be provided and the water thus kept at a constant height in the pipe 211.

Alternate to the design above, a flexible or solid triangular-shaped manifold diffuser can connect the pipe 211 to the active section 230, which permits wider active sections 230 to be used with smaller diameter pipes. Wider active sections of 50 cm to 150 cm or even larger may be preferred for larger filter throughputs for example.

Figure 3:
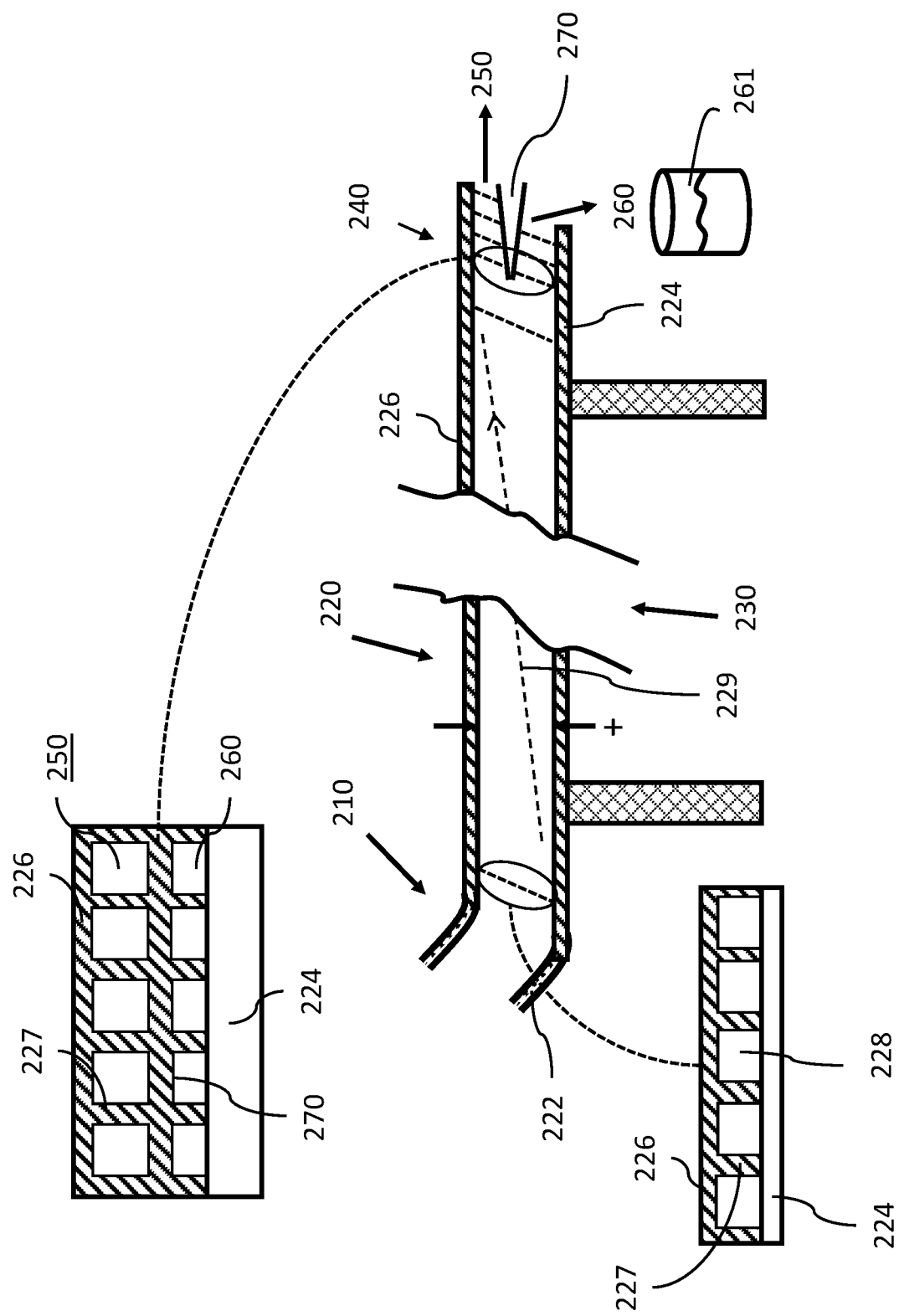
FIG. 3 shows details of the inlet and outlet of the embodiment of FIG. 2.

As shown in FIG. 3, the inlet manifold extension 222 connects with an active section 230 of the water filter 220. In this embodiment, an ion-exchange membrane such as a NAFION 1110 membrane commercially available from Chemours can be used as a diffusiophoretic-inducing membrane 224. Higher strength membranes such as NAFION N2100TX may be preferable. A thickness of at least 100 micrometers and preferably 200 micrometers for the diffusiophoretic-inducing membrane 224 is desired, as these not only are stronger but last longer for exchanging H+ ions with Na+ ions in the water to be filtered.

The membrane 224 is connected to a top cover 226 made for example of silicone or other expandable material, as the membrane 224 will swell when wetted. The cover preferably has ridges 227 that are bonded to the membrane 224 to form a channel structure of side-by-side elongated channels in the active section 230.

As water containing for example salt as described in the Lee article in the Background Section enters active section 230, negatively-charged colloidal particles 229 move away from membrane 224 due to diffusiophoresis as Na+ ions exchange with H+ ions in the membrane. The negatively-charged colloidal particles are exited with waste water at exit 250, and may include bacteria, viruses and other negatively-charged colloidal particles. Filtered water, split from the waste water by a splitter 270 exits at filtered water exit 260, for example into a cup 261.

Much of the water to be filtered will contain naturally occurring NaCl in concentrations sufficient to induce diffusiophoresis. However, the water filtration system can include packets of NaCl to increase the sodium concentration, so that for example salt concentrations of about 1 mM can be provided. A handheld salinity tester, such as a salinity tester refractometer commercially available from Extech, may be provided with the water filtration system and may be be placed with the salt packets inside tube 211 and packed within the sealed plastic bag 300.

Cover 226 can be rather thick in this embodiment, for example 1 mm thick silicone and the ridges 227 can be created by cutting channels into the silicone, for example by laser, so that the thickness of channels 228 is approximately for example between 200 and 600 micrometers, most preferably 300 micrometers in this example. The splitter structure 270 can be created for example by laser or milling, although other methods such as soft lithography can be used. Removable outlet structures mating with the active section are also possible.

The cover 226 can be bonded to the membrane 224 for example using SIL-PDXY silicone adhesive or other silicone adhesives capable of bonding with NAFION, and any adhesive thickness may be accounted for in the channel thickness.

A flexible and durable diffusiophoretic water filter 220 thus is created, and can be placed on any structure such as stretched between legs shown in FIG. 3 or the ground as shown in FIG. 2.

FIG. 3 shows schematically the movement of colloidal particles 229 away from membrane 224 and toward outlet 250. As shown by the cross-sectional cutouts, cover 226 with its ridges 227, and membrane 224 defines channels 228 at the inlet, while at the outlet splitter 270 divides the channels into waste outlet 250 and filtered water outlet 260. Water can exit outlet 260 simply via gravity.

Splitter 270 can be manufactured integrally out of PDMS material for example as described above, and be for example 10 micrometers thick at its leading edge and, while not necessary, then thicken to be V-shaped. However, splitter 270 also could be for example a metal blade, for example with cross sectional dimensions similar to a razor blade described in U.S. Patent Application No. 2018/0043561, but with a width for all channels. The blade could be placed inside pipe 211 and placed by hand halfway into the cover 226 at the ridges 227. Notches on the rear edges of the ridges could be provided at the halfway point to aid insertion of the metal blade.

With 5 channels each 2 cm wide and 300 micrometers thick, an active section length of 1 m, and a water height of about 40 cm and a splitter ratio of 50/50, the water filter 220 can process approximately 1.4 ml/s of water, 0.7 ml/s of which is clean, providing a clean water capacity of 42 ml/min or 2.5 l/hr. The velocity through the device is approximately 0.044 m/s, which gives a dwell time of 23 seconds, which can allow for sufficient diffusiophoretic movement of colloidal particles. Depending on the type of particles to be filtered and the desired concentration of colloidal particles, lower capacity and speeds can be easily provided by using lower water heights. Longer active length sections could also be provided without decreasing capacity.

The NAFION membrane can operate for several hours or even days before being exhausted of H+ ions, and the present invention thus can provide an easy and highly portable way to filter water from contaminated sources. Military and emergency operations are especially advantageous for the present device, which can be discarded after use.

Wider membranes for larger capacities are easily provided as well, for example with use with larger pipes or simple the same sized pipe but with a triangular extension of the inlet manifold described above.

Figure 4:
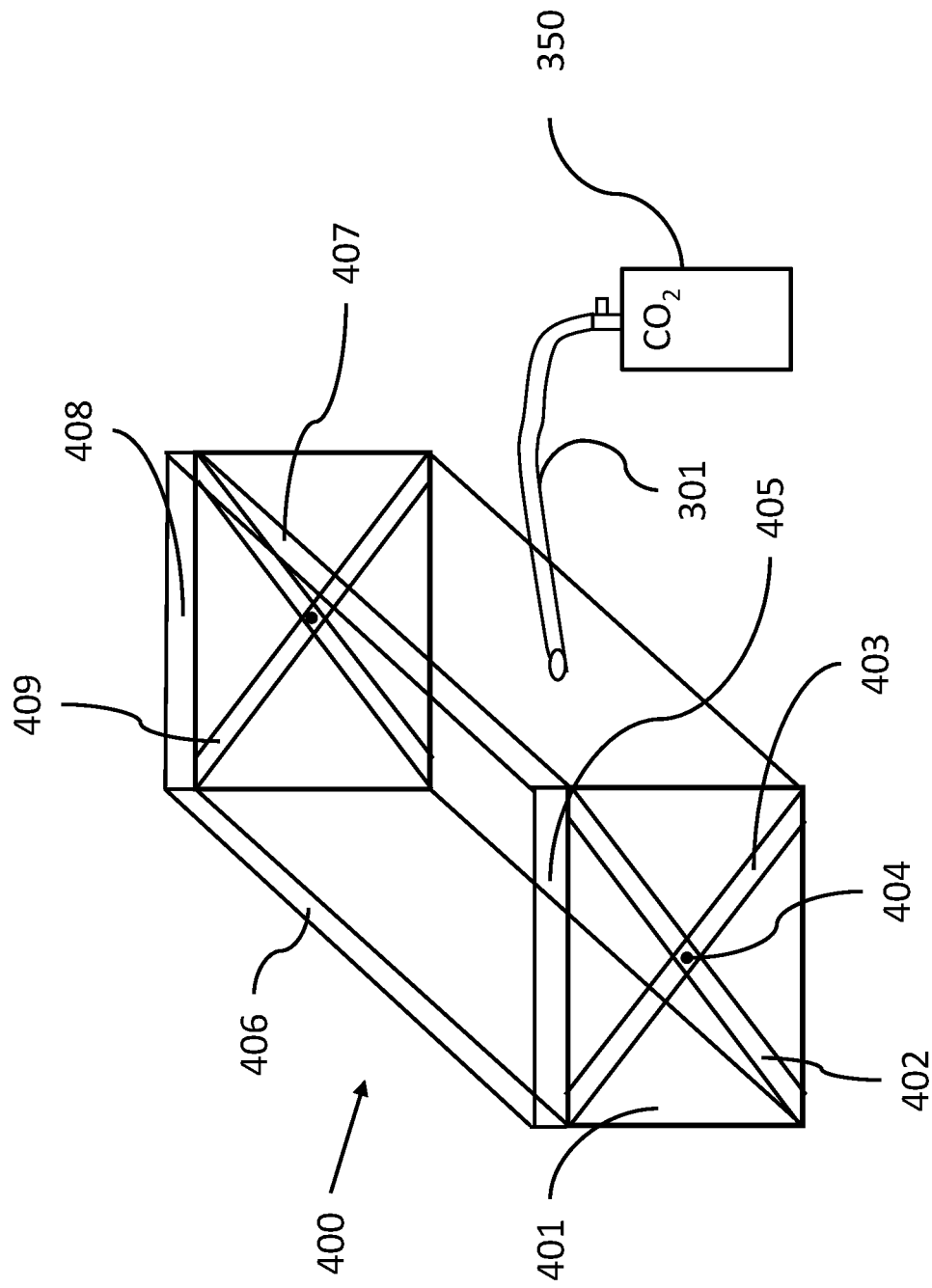
FIG. 4 shows a portable gas chamber for use with a further embodiment of the present invention.

FIG. 4 shows a portable gas chamber 400 for use with a gas-induced portable water filtration system. A portable carbon dioxide tank 350 can provide carbon dioxide via a tube 301 to a flexible bag 401, made for example of silicone 1 mm thick, and stretched over legs 402, 403 409. Legs 402, 403 can rotate around a bolt 404 (as can legs 409). The legs 402, 403 can be held at a fixed distance by width bars 405, which can for example snap fit with the tops of the legs or be fixed in any known manner. Width bar 408 provides the same for legs 409. Length bars 406, 407 can keep legs 402, 409 at a fixed length apart. Bag 401 fits over the legs and extends therebetween with the top being open. A gas-operated diffusiophoretic portable water filtration system can be placed over the top and clamped thereto, and operate in much the same manner as portable water filtration system 200, but with carbon dioxide provided for example at 1.3 atm of pressure. Cover and membrane thicknesses are much smaller, on the order of 10 to 100 micrometers to permit carbon dioxide diffusion. U.S. Pat. No. 10,155,182 issuing on Dec. 18, 2018 and its corresponding U.S. application Ser. No. 15/861,273, filed on Jan. 3, 2018, describes such gas-driven diffusiophoretic filters and is hereby incorporated by reference herein.

What is claimed is:

1. A water filtration device comprising:
a diffusiophoretic water filter having: an inlet and an outlet and for receiving a colloidal suspension at the inlet and flowing the colloidal suspension between the inlet and the outlet in a flow direction; a diffusiophoretic-inducing membrane; a cover, the membrane and the cover defining a plurality of channels extending between the inlet and the outlet; and an outlet splitter for the plurality of channels being fixed with respect to the membrane or the cover, both the cover and membrane being flexible and configured to permit rolling up of the membrane and the cover together.

2. The water filtration device as recited in claim 1 wherein the outlet splitter is also flexible and capable of being rolled up.

3. The water filtration device as recited in claim 1 wherein the outlet splitter is integral with the membrane or the cover.

4. The water filtration device as recited in claim 1 further comprising an inlet manifold for receiving the colloidal suspension including colloidal particles in water.

5. The water filtration device as recited in claim 4 wherein the inlet manifold includes an integral extension of the membrane and/or the cover.

6. The water filtration device as recited in claim 1 wherein the cover is fixed to or integral with the membrane.

7. The water filtration device as recited in claim 1 wherein the membrane is unstructured and the cover is a structured cover defining the plurality of channels.

8. The water filtration device as recited in claim 1 wherein the membrane is made of an ion-exchange membrane sheet.

9. The water filtration device as recited in claim 1 wherein the membrane is at least 5 cm in width.

10. The water filtration device as recited in claim 1 wherein the cover is made in one piece together with a channel structure of longitudinally extending microchannels.

11. A portable water filtration system comprising a bag and the water filtration device as recited in claim 1 packaged in the bag.

12. The portable water filtration system as recited in claim 11 wherein the bag is sealed.

13. The portable water filtration system as recited in claim 11 wherein the cover and membrane are in a rolled shape.

14. The water filtration device as recited in claim 1 further comprising a gas chamber and a carbon dioxide source connected to the gas chamber.

15. The water filtration device as recited in claim 14 wherein the gas chamber is portable.

16. The water filtration device as recited in claim 15 wherein the carbon dioxide source is a portable carbon dioxide tank.

17. The water filtration device as recited in claim 14 wherein the cover and the membrane are clamped to the gas chamber.

18. The water filtration device as recited in claim 1 wherein the cover and the membrane are made of PDMS.

19. The water filtration device as recited in claim 18 wherein the outlet splitter is capable of being rolled up.

20. The water filtration device as recited in claim 1 wherein the cover and membrane are portable when rolled up together.

* * * * *